US005953136A

United States Patent [19]
Kraft et al.

[11] Patent Number: 5,953,136
[45] Date of Patent: Sep. 14, 1999

[54] METHOD FOR PRODUCING PHOTOGRAPHIC COPIES FROM PHOTOGRAPHIC ORIGINALS

[75] Inventors: Walter Kraft, Zürich; Peter Zolliker, Dielsdorf, both of Switzerland

[73] Assignee: Gretag Imaging AG, Switzerland

[21] Appl. No.: 08/905,768

[22] Filed: Aug. 4, 1997

[30] Foreign Application Priority Data

Aug. 21, 1996 [EP] European Pat. Off. ............ 96 810 554

[51] Int. Cl.⁶ ........................................... H04N 1/46
[52] U.S. Cl. ............................................ 358/504; 395/109
[58] Field of Search ....................... 358/504, 506, 358/406, 471, 487; 355/18, 33, 71; 395/109

[56] References Cited

U.S. PATENT DOCUMENTS

| | | | |
|---|---|---|---|
| 4,335,956 | 6/1982 | Findeis et al. | 355/27 |
| 5,218,671 | 6/1983 | Liao | 395/131 |
| 5,271,096 | 12/1993 | Cook et al. | 395/109 |
| 5,333,069 | 7/1994 | Spence | 358/517 |
| 5,345,315 | 9/1994 | Shalit | 358/406 |
| 5,809,213 | 9/1998 | Bhattacharjya | 358/504 |
| 5,813,771 | 9/1998 | Ur et al. | 400/74 |
| 5,818,960 | 10/1998 | Gregory et al. | 358/504 |

FOREIGN PATENT DOCUMENTS

| | | |
|---|---|---|
| 0 475 897 A1 | 9/1991 | European Pat. Off. ......... H04N 1/60 |
| 0 586 773A1 | 9/1992 | European Pat. Off. . |
| 5-316351 | 11/1993 | Japan ............................... H04N 1/40 |

OTHER PUBLICATIONS

Practical Methods Of Optimization, R. Fletcher, vol. 1, Unconstrained Optimization, John Wiley & Sons, 1980, Table of Contents only.
Practical Methods Of Optimization, R. Fletcher, vol. 2, Unconstrained Optimization, John Wiley & Sons, 1981, Table of Contents only.

*Primary Examiner*—Jon Chang
*Assistant Examiner*—Jingge Wu
*Attorney, Agent, or Firm*—Burns, Doane, Swecker & Mathis, LLP

[57] ABSTRACT

In a method for producing photographic copies, first copies are produced in a first pass in a first printer, and any second copies needed are produced in a second pass by a second printer which is calibrated to the first printer by means of a setup test method. In this setup test method, the original-specific data ascertained in the first pass are delivered to a computing and control unit of the second printer. With the aid of these original-specific data and with the aid of an original model adapted to the copying material, the requisite quantities of copying light are ascertained in the computing and control unit of the second printer, and the second copies are made. The developed second copies are subjected to an analysis. Based on the analysis, the original model adapted to the copy material is optimized for the second printer until the second copies are substantially identical to the first copies.

8 Claims, 7 Drawing Sheets

METHOD FOR PRODUCING PHOTOGRAPHIC COPIES FROM PHOTOGRAPHIC ORIGINALS

BACKGROUND OF THE INVENTION

1. Field of the Invention

The invention relates to a method for producing photographic copies from photographic originals.

2. State of the Art

Typically, photographic copies of photographic originals are produced by photographic copiers (printers), in which the originals are exposed to copying light and projected onto photographic copy material. Very often in the industry, the original material is exposed negative film strips, which contain frames acting as originals, and in which the copy material is photographic paper, or photo paper, on which the paper prints are produced in the form of photographic copies. For the sake of simplicity, this situation will therefore be addressed as an example; that is, the negative films or the frames on them stand as a representative example of original material or originals, and the photo paper or the paper prints are a representative example of photographic copy material or photographic copies. Naturally, slides can also serve as originals, and sheets can serve as photographic copies.

Customers who turn in their exposed negative films so that paper prints can be made from them increasingly expect ever shorter processing times for their orders while requiring high quality of the paper prints. Today, in large photo processing laboratories, high-speed printers that are designed for very high throughput rates are used to make the photographic copies. To assure the most efficient, interruption-free operation and hence the most optimal possible utilization of capacity and economical operation of the printer, the individual negative film strips are typically delivered to the high-speed printer in the form of a length of film spliced together. To that end, a large number of negative film strips are spliced into one long, cohesive length of film which is wound up into a roll. From such a roll, the length of film is then fed into the copier—that is, the printer—where the projection of the frames onto the still unexposed photo paper takes place, the photo paper typically being delivered to the printer in the form of a length of paper. The length of film is subsequently cut into short strips—typically with four frames each. The exposed length of photo paper is developed in a copy material processor, for example a paper processor, and the individual paper prints on the length of photo paper are cut apart. Finally, the negative film strips and the associated paper prints are collated order by order and placed in envelopes.

In photographic copiers (printers), it is normally not possible to use standardized, uniform quantities of copying light; instead, exposure control processes are employed, in which the most optimal quantities of copying light, and in particular the exposure times for the three basic colors of blue, green, red are determined for the individual frames. Both the specific properties of the copy material (photo paper) and the film-specific properties and the properties of the frame must all be taken into account. Such exposure control processes are disclosed in European Patent Disclosures EP-A 0 475 897 and EP-A 0 586 773.

In such exposure control processes, the individual frames of the negative films are analyzed. The analysis is performed, initially by regional scanning (for example, pixel by pixel), of the frame of the negative film to be copied with the aid of scanning light in a scanning station of the printer. The scanning light transmitted or remitted from each scanned region of a frame of the negative film is delivered to a detector array, broken down spectrally, and converted into wavelength- and intensity-dependent electrical scanning signals. The electrical scanning signals are then digitized, and with the aid of these signals, frame-specific data are ascertained. With the aid of the data obtained, the requisite quantities of copying light are then ascertained.

To enable the quantities of copying light required in the various colors of blue, green and red to be ascertained correctly, the reaction of a particular photo paper to changes in the respective colors of the copying light must be known (i.e. how the paper density varies over the concentration of the pigments of yellow, magenta, and cyan as a function of a change in the copying light in the colors blue, green and red). Thus a model for the photo paper—a paper model—must be known, which is representative for the absorption properties of the photo paper in the event of a change in the exposure. Naturally, this paper model also has to take into account the secondary absorptions of the photo paper. Secondary absorption means that when light of one color, such as blue, acts upon the photo paper, a change in the optical density of the photo paper in all three colors results.

A model must also be known for how the photo paper reacts to changes in the spectral film density of the negative film in order to determine how the copying light (exposure) has to be changed to compensate for deviations in the actually measured density of a negative from the average film density (that is, a deviation from the "norm"). Since, to that end, the film must be viewed with the "eyes of the photo paper", this is a paper-related film model.

If both models, namely the paper model and the paper-related model, are adequately well known and optimized, then the printer is setup-tested. As a rule, it is now possible to predict what change in the copying light in the particular color of blue, green or red is necessary in order to achieve a certain change in the paper density in the colors yellow, magenta and cyan. Thus, once a printer has been setup-tested using the ascertained data for the particular frame, the quantities of copying light required for the projection can be determined. Based on these quantities of copying light, corresponding control signals are ascertained for color filters provided in the copying station of the printer. These filters are placed in the copying beam path in accordance with the control signals when the negative frame is copied onto the photo paper. Once the negative frame has been copied onto the photo paper, the copies made in this way are developed in a developing station which may be an integral component of the printer.

Although such exposure control processes are very powerful and have stood the test of time, it often happens that the copies made in a first pass may not meet the customer's high demands for picture quality. The paper prints produced in a first pass are typically inspected, and the operators determine correction values for the paper prints that are not satisfactory. The originals corresponding to the unsatisfactory copies are copied again in a second pass, taking into account the determined correction values. As a rule, the operators input these correction values manually, for instance via a keyboard, into the computing and control unit of the printer.

For the second pass, a plurality of fundamentally different methods and procedures are known. One method is the use of the same printer for the second pass to produce the corrected copies of the first pass. Two basic variants of this can be distinguished.

In the first variant, the entire length of film spliced together on a roll is rewound, after the first pass, onto a roll on the output side of the printer; that is, the length of film is not cut apart. This roll is then docked to the input side of the printer, and the entire length of film is sent through the printer once again. In the second pass, however, only those frames that produced unsatisfactory copies in the first pass are projected onto the photo paper; the other frames pass through the printer without being projected again.

In the second variant, the length of film is cut apart into short strips—typically with four frames each—after the first pass, and the strips that contain frames that produced unsatisfactory copies in the first pass are separated out and spliced together again and collected, for instance on a roll. This roll is then docked to the input side of the printer, and the second pass is performed.

In both variants, during the second pass, the frames that produced unsatisfactory copies in the first pass are rescanned in the scanning station of the printer and analyzed. In the ensuing determination of the quantities of copying light, the correction values determined by the operators after the first pass are taken into account. However, the problem then arises that the frame-specific data (without taking the correction values into account) determined in the second pass can deviate from those data determined for the same frame in the first pass. There are various reasons for this. For instance, the originals in the second pass in the scanning station may have shifted slightly in position compared with the first pass, so that the scanned regions of the original in the second pass are not completely identical to those of the first pass. As a result it is possible that the exposure values determined in the second pass may deviate from those determined in the first pass, even without considering the correction values but only because of the slightly shifted scanned regions.

Another reason arises particularly in the aforementioned second variant, in which the short negative strips are re-spliced together after the first pass. It is a known method that before a frame is projected, a relatively large number of frames, for instance all those in one negative film, are first scanned in the scanning station, and film-specific data resulting from the scanning of a plurality of frames are utilized to calculate the exposure. If in the second pass the individual short negative strips, each containing four frames and generally making up only a fraction of the original negative film, are now spliced together, once again this can mean that in the second pass, even without taking into account the correction values, quantities of copying light can be determined that differ from those of the first pass.

Since the quantities of copying light determined in the first and second passes for an individual frame can differ even before taking the correction values into account, taking the correction values into account in the second pass does not lead to the desired improvement in picture quality. Under this scenario, still another copying procedure must be performed. This situation is highly undesirable from the standpoint of economical and efficient operation of the printer.

To solve this problem it has been proposed that in the first pass, certain exposure values be stored in memory and reused in the second pass. Consequently, in the second pass the frame-specific data are not redetermined entirely. Instead, the exposure values of the first pass are used together with the correction values determined in order to determine the quantities of copying light for the second pass. But even this method has various disadvantages. In particular, it does not facilitate the optimal utilization of the printer's capacity. Modern high-speed printers used in large photoprocessing laboratories are technologically very complex, extremely powerful machines, in which high-quality components are used. It is understood that such machines are relatively costly, and it is therefore desirable that their capabilities and capacities be utilized as optimally as possible, to assure economical and efficient operation. However, if one performs the second pass as well on such a high-speed printer, this is not making optimal use of such a printer, because in the second pass, not every frame is projected but only those that produced unsatisfactory copies in the first pass. When the exposure values of the first pass are used for the second pass, the scanning station, which is designed to be of very high quality, is practically unused. Moreover, in the case where the short negative strips have to be re-spliced after the first pass, a large number of such short negative strips with frames not correctly exposed in the first pass have to be collected together to makeup a roll that is sufficiently large to make it worthwhile to process it using the high-speed printer in the second pass. Yet the waiting time needed for collecting these strips can cause delays and can slow down the total processing time for a customer order.

These are the reasons for the changeover in many large processing laboratories so that the first pass is done on a high-speed printer, while the necessary corrections are made using another printer. The second pass and possibly every further printing pass is normally done with a printer, such as a minilab, that is less powerful and is designed for lesser throughputs. But even this method is still in need of improvement because the first pass data—if they are available at all or can be transferred to the second printer—are of only very limited use for the second pass, since identical exposure values, such as exposure times, normally do not lead to identical copies on both the high-speed printer and the second printer. The two printers have different exposure systems, such as different copying light sources and/or different color filters. As a rule, the frames or originals in the second printer must be rescanned to determine the quantities of copying light, which has the disadvantages already described above. If one were to perform the second pass in the second printer using the same exposure times that were used in the first printer to make the first copies, then the second copies, despite the same exposure times, would differ from the first copies. It is clear that efficient, targeted correction in the second pass can be accomplished only with great difficulty. Since the first pass data can hardly be used in such a method, there is also a need for improvement in the second method using two printers.

SUMMARY OF THE INVENTION

It is therefore an object of the invention to furnish a method for producing photographic copies of photographic originals, which enables optimal utilization of the printers even if it is necessary to perform a second pass in order to produce high-quality copies. In particular, the method makes it possible for original-specific data (frame-specific data), as determined in a first printer, to be used in a second printer to make further copies (paper prints).

According to exemplary embodiments of the invention, in a first pass performed by a first printer, first copies are produced, and second copies are produced in a second pass, by means of a second printer which is calibrated to the first printer by means of a setup test method. The original-specific data (frame-specific data) ascertained in the first pass by means of the first printer are delivered to a computing and control unit of the second printer. With the aid of this original-specific data and with the aid of an original model (paper-related film model) adapted to the copy material (photo paper), where the model represents the behavior of the copy material (photo paper) when there are changes in the spectral composition of the original (frame), the quantities of copying light for the projection of the respective frame in the second printer are ascertained in the computing and control unit of the second printer. From the quantities of copying light ascertained, control signals are ascertained for color filters and shutters provided in the copying station of the second printer. These filters and shutters are placed in the copying beam path on the specification of the control signals in the copying of the original (frame) onto the copy material (photo paper). The second copies produced in this way are developed in a developing station, such as a paper processor, and then subjected to an analysis. Based on the analysis, the original model (paper-related film model) adapted to the copy material of the second printer, is again optimized in each case until the second copies are substantially identical to the first copies. Once this state is reached, the second printer is calibrated to the first printer. The second printer is thus capable, with the original-specific data (frame-specific data) that were ascertained in the first printer, of creating identical copies to those made by the first printer.

By this calibration of the second printer to the first printer, it is thus possible for the original-specific data of the first pass to be utilized effectively and simply for the second and subsequent passes. It is no longer necessary to rescan the originals (frames) in the second printer. In this way, an optimal utilization of the printers and efficient processing of customer orders becomes possible. The first pass can be performed on a high-speed printer designed for high throughputs, which in interruption-free operation produces only the first copies each time and makes the original-specific data available to a second printer for any second copies that may be needed. The second copies, with the requisite corrections, are made on a second, and as a rule, less powerful, printer. This optimizes the use of the original-specific data ascertained by the first printer. In comparison to the rescanning of the original in the second printer, this method has the additional advantage that corrective measures improve picture quality of the second copy.

In an exemplary method of the invention, in calibrating the second printer to the first printer, the developed second copies, if they do not correspond well enough to the first copies, are scanned regionally. Again, this regional scanning can be pixel by pixel, and the scanning light transmitted or remitted from each scanned region of the second copies is delivered to a detector array. Here, the scanning light is broken down spectrally and converted into wavelength- and intensity-dependent electrical scanning signals. These electrical scanning signals are digitized and evaluated for emitting copy-specific data. With the aid of the copy-specific data, the original model (paper-related film model), adapted to the copy material, is optimized for the second printer, while the original-specific data determined in the first pass remain unchanged. This process of making second copies, analyzing them and modifying the original is repeated until the original model is optimal. In other words, until second copies that are substantially identical to the first copies can be made with the second printer using the original-specific data determined in the first pass.

In an exemplary method of the invention for making photographic copies, the developed first copies are each subjected to an inspection, in which a determination is made as to whether a second copy will be made from the associated original and in which the optional correction values are determined for making the second copy. The originals from which the second copies are made and the associated correction values are also delivered to the second printer, and the correction values are transformed in the computing and control unit of the second printer into exposure correction values, which together with the original-specific data from the first pass are used to determine the quantities of copying light for making the respective second copy.

In a variant embodiment of the invention, the scanning signals resulting from the spectral scanning of the original in the first pass that are digitized, are subjected to an orthogonal transformation or data compression, such as the Karhunen-Loève transformation (see, for example, EP-A 0 475 897, cited above). The transformation coefficients originating in this transformation form the original-specific data (frame-specific data), which are used both as input variables for the original model (paper-related film model) in the first pass in the first copy, and as input variables for the original model (paper-related film model) in the second pass in the second printer. In principle, however, the densities in the basic colors of blue, green and red, as can be determined for instance using conventional scanners, are suitable as the input variables for the original model (paper-related film model) in the first and second printers.

Exemplary embodiments also use production negatives for the setup test method for calibrating the second printer to the first printer.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

In accordance with an exemplary method of the invention, typically two photographic printers are used. A first printer in which first photographic copies of the photographic originals are made in a first pass, and a second printer in which second photographic copies needed are made from the photographic originals in a second pass. The first printer can be a high-speed printer of the kind sold by Gretag Imaging AG, and the second printer can be a so-called minilab, of the kind also sold by Gretag Imaging AG. In an exemplary method of the invention, the second printer is calibrated to the first printer by a setup test method, which will be described in further detail. This makes it possible for the original-specific data determined in the first pass in the first printer to be used efficiently by the second printer as well to make second copies, especially in cases where the second printer has a different exposure system from the first printer. This also has the advantage that any corrections needed in making the second copies can be made in a markedly more targeted and effective way.

In the ensuing description, for the sake of simplicity and by way of example, reference will be made to the frequent situation in the industry where exposed negative film strips on which frames are located as originals serve as original material, and photo paper serves as copying material, on which the photographic copies are made in the form of paper prints. The negative films, or the frames located on them, are thus a representative example of original material or originals, and the photo paper or paper prints are a representative example for photographic copying material or photographic copies. It will be understood that methods of the invention are not limited to this example. For instance, slides in particular can also serve as originals and sheets can serve as the photographic copies.

Figure 1:
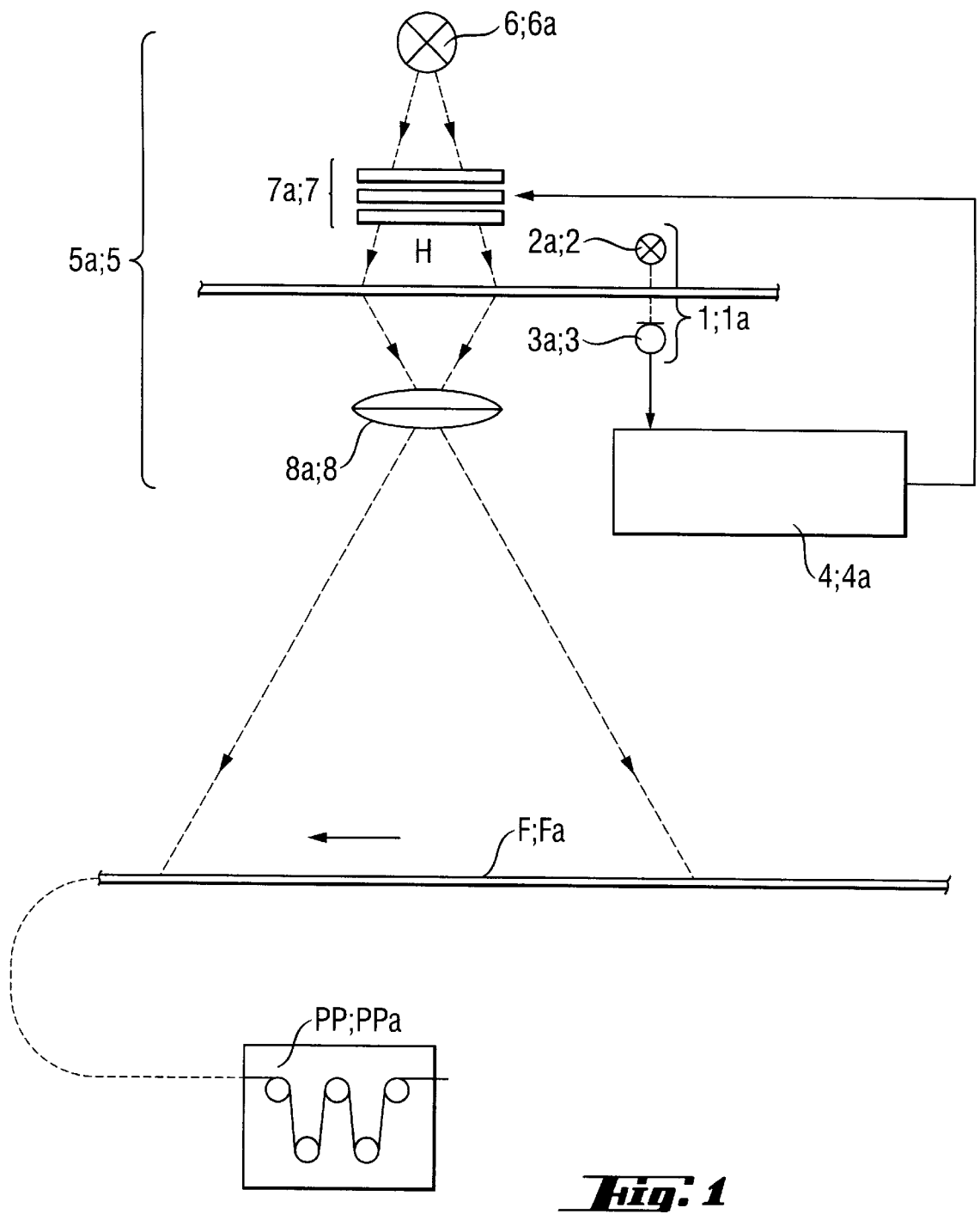
FIG. 1 shows an arrangement of portions of a photographic printer with a downstream developing station for developing the exposed copy material.

The general mode of operation of a typical photographic printer, known per se, will now first be described, in terms of the first pass for making the first copies in the first printer. Since the two printers used for an exemplary method of the invention can essentially be identical in terms of their basic mode of operation, the following explanation of a general mode of operation of a printer applies in logically the same way for the second printer as well. However, to make it clear that the individual corresponding parts of the two printers can certainly be embodied differently (an example being different exposure systems), the components shown in FIG. 1 are provided with two reference symbols. For the explanation below, the reference symbols followed by the letter "a" pertain to the second printer, and those without the "a" pertain to the first printer.

In FIG. 1, an arrangement of parts of a photographic printer sufficient for understanding aspects of the present invention are shown schematically, along with a downstream paper processor PP (PPa) as a developing station. It includes a scanning station 1 (1a), in which by means of a scanning light source 2 (2a) and a detector array 3 (3a), a negative film N containing the frames is scanned regionally, such as pixel by pixel. According to exemplary embodiments of the invention, the second printer need not necessarily have such a scanning station 1a. However, since commercially available printers that are suitable for practicing methods according to the invention currently have a scanning station for scanning the negative film N, it will be assumed that the scanning station 1a is also provided in the second printer.

In the first pass, the negative film N is scanned regionally (for example, pixel by pixel), in the scanning station 1. The light transmitted from each scanned region of the negative film N is broken down spectrally by the detector array 3 and converted into wavelength- and intensity-dependent electrical scanning signals. These electrical scanning signals are then digitized and evaluated to ascertain original-specific data, which are specific to the particular frame. This digitizing and evaluation can be performed either in the detector array 3 or a downstream computing and control unit 4 (4a). With the aid of these original-specific data, the quantities of copying light needed to project this frame onto copy material are ascertained by the computing and control unit 4 (4a). Once the requisite quantities of copying light have been determined, control signals are generated accordingly by the computing and control unit 4 (4a) and serve to control color filters 7 (7a) provided in the downstream copying station 5 (5a). Those skilled in the art will appreciate that other known methods can also be used for controlling the exposure in the three colors in question, such as those that use color filters and shutters. In the copying station 5 (5a), the actual projection of the respective frame onto the photo paper F (Fa) is performed. The projection of the frames onto photo paper is done such that the color filters 7 (7a) are moved into the beam path of a copy light source 6 (6a) in accordance with the control signals generated in the computing and control unit 4 (4a). By means of a projection optical element 8 (8a), the appropriate frame is then projected onto the photo paper F. The exposed photo paper is then developed in the paper processor PP (PPa). This paper processor PP (PPa) can be a component of a complete photographic processing line, or it can be an independent apparatus. To this extent, the arrangement shown in FIG. 1 is equivalent to the prior art described in numerous printed references.

Before the setup test process for calibrating the second printer to the first printer is explained, some preliminary remarks will be provided regarding the determination of the quantities of copying light or exposure times in known photographic printers. If the quantities of copying light needed for the colors blue, green and red are to be ascertained correctly, it is advantageous—as already explained above—to use two models, to represent the photo paper and the negative film, namely a paper model and a paper-related film model. This modeling is symbolically illustrated in FIG. 2. The paper model 10 (10a) essentially replicates how the paper density, that is, the color density of the photo paper, which is determined essentially by the concentration of the pigments yellow, magenta and cyan, changes for a particular photo paper as a function of changes in the copying light in the three basic colors, blue, green and red. The paper model 10 (10a) is accordingly representative of the absorption properties of the photo paper if there are changes in the exposure to light. In particular, the paper model 10 (10a) also takes into account overlaps of the spectral paper sensitivities and secondary absorptions, a term understood to mean that subjecting the photo paper to light of one of the basic colors causes changes in the optical density of the photo paper in all three colors. Conversely, the paper-related film model 20 (20a) indicates how the photo paper reacts to changes in the negative film density when the copying light is kept constant. This model thus also shows how the copying light must be modified in order to be able to compensate for deviations in the actually measured density of a negative from the average film density. However, this means that the film has to be looked at "with the eyes of the photo paper", which are generally different from the "eyes of the detector array 3". For this reason, the term paper-related film model is used.

The "average film density" should be understood as a reference value or norm for the film density. For example, it can be defined by a neutral gray standard original, or can be ascertained via the scanned spectral densities of many originals.

Figure 2:
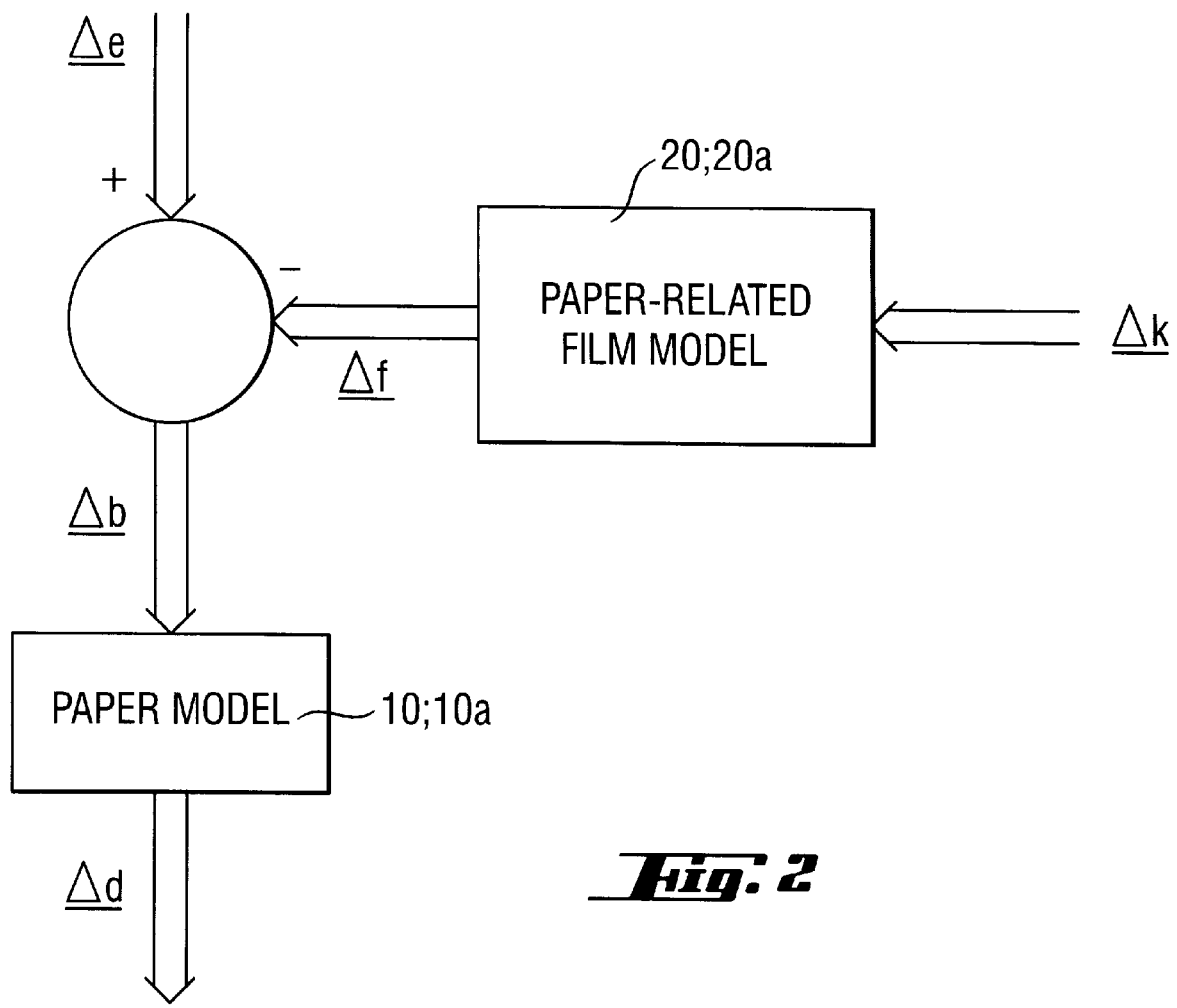
FIG. 2 is a general overview for illustrating cooperation of the paper-related film model and the paper model.

It is understood that the two models 10 (10a) and 20 (20a) need not be identical for both printers; this is why for the two models in FIG. 2, two reference symbols are shown, with the letter "a" again indicating that the second printer is intended.

The input and output variables entered in FIG. 2 for the two models 10 (10a), 20 (20a) and the vector Δe have the following meanings: the copying light can be generally characterized by its blue, green and red components, which are summarized in a vector $$e = e_0 + \Delta e = (e_B, e_G, e_R);$$

where the subscripts B, G, R stand for blue, green and red. The vector e designates the particular copying light vector, which is composed of the two vectors $e_0$ and $\Delta e$. Here, $e_0$ designates a copying light vector with which a negative that has the average film density is projected correctly onto the photo paper, and $\Delta e$ designates the deviation from the average copying light vector $e_0$.

The vector $\Delta k$ is a variable explained in further detail hereinafter, and accurately represents the spectral density distribution of the original. Vector $\Delta k$ acts as an input variable for the paper-related film model 20 (20a). The density of the original or negative is described by the film density vector f, which is defined as follows:

$$f = f_0 + \Delta f = (f_B, f_G, f_R);$$

in which the subscripts B, G, R stand for blue, green and red; the vector $f_0$ designates the average film density; the vector $\Delta f$ designates the deviation from this average film density; and the components $f_B$, $f_G$, $f_R$ designate the components of the vector f in the colors blue, green and red.

The paper density values are likewise characterized by the corresponding paper density vector $$d = d_0 + \Delta d = (d_Y, d_M, d_C);$$

in which the subscripts Y, M, C stand for yellow, magenta and cyan; the vector $d_0$ designates the average paper density; the vector $\Delta d$ designates the deviation from this average paper density; and the components $d_Y$, $d_M$, $d_C$ designate the components of the vector d in the colors yellow, magenta and cyan.

If a negative film is moved into the exposure beam path (copying light), the effective exposure b for the three color layers of the photo paper decreases. This exposure reduction is written in vector terms by means of the vector:

$$b = e - f.$$

In accordance with FIG. 2, the paper-related film model 20 (20a) accordingly serves to determine, from the vector $\Delta k$ which is representative of the density distribution of the respective original, the vector $\Delta f$ that describes the deviation in the density of the respective original from the average film density. With the paper model 10 (10a), it can be calculated what change in the density $\Delta d$ of the copy results if the effective exposure is modified by a vector $\Delta b$. Conversely, with an inverse model—called the inverse paper model—of the paper model 10 (10a), it can be calculated what change $\Delta b$ in the effective exposure must be achieved in order to attain a predetermined change $\Delta d$ in the density of the copy. With the aid of the paper model, the requisite exposure change needed to achieve a certain change in the paper density can be predicted accurately.

As already noted, when copying light characterized by the copying light vector $e_0$ is imposed (in a calibrated apparatus) on an original that has the average film density $f_0$, the result is a copy that has the paper density ($d_0$) sought. Based on this fundamental state, it is possible with the models 10 (10a), 20 (20a) shown in FIG. 2 to predict the influence of changes in the copying light (vector $\Delta e$) and the film density (vector $\Delta f$) on the paper density (vector $\Delta d$). Naturally, this prediction (and the prediction of the correction that may possibly be needed) will become better as the individual models (pm 10 (10a), paper-related film model 20 (20a) more closely replicate actual conditions. Leaving aside corrections specified by the user for the time being, the goal in exposure calculation in production operation is first to ascertain the deviation in the film density ($\Delta f$) of a given negative to be copied from the average film density ($f_0$) with the aid of the paper-related film model 20 (20a) and to determine the copying light vector $\Delta e$ in such a way that the effective exposure b again corresponds to the value that leads to the desired paper density ($d_0$) in the copy.

For example, the paper-related film model can be an exposure matrix, which transforms the respective input vector $\Delta k$ into the film density vector $\Delta f$. Such an exposure matrix is known, for example from EP-A 0 475 897, the disclosure of which is incorporated by reference in its entirety, to provide an adequately accurate realization of the paper-related film model (20 (20a)). The input vector $\Delta k$, with which the exposure matrix is linked, can be determined as follows: in the pixel-by-pixel scanning of the negative in the scanning station 1 (FIG. 1), spectral transmissions (or in the case of remission scanning, spectral remissions) from each scanned region (measurement point) are first determined. To that end, the light emitted by the scanning light source 2 and transmitted through the scanned region (measurement point) of the negative, is converted by the respective detector of the detector array 3 into a corresponding electrical scanning signal, which is equivalent to the transmission of the negative at a certain wavelength. These transmission values are converted logarithmically into spectral density values and compared with a corresponding reference density, such as a neutral gray standard original. The resultant spectral density differences are then subjected to a transformation, such as the known Karhunen-Loève transformation. From the transformation coefficients—hereinafter "KLT coefficients" for short—a number of transformation coefficients, (for example, seven or any other number) are representative of the density distribution of the original, and are selected by certain criteria (see, for example, EP-A 0 475 897). These seven transformation coefficients are represented in the vector $\Delta k$ and in the illustration of FIG. 2 form the input variable, which is linked with the exposure matrix as:

$$\Delta f = E \Delta k \quad (E = \text{exposure matrix}),$$

to obtain the respective film density vector $\Delta f$, which is a measure of the deviation in the density of the respective negative of the film from the average film density $f_0$. Accordingly, the components of the vector $\Delta k$ are KLT coefficients. It is clear that in the case where there are seven transformation coefficients of the vector $\Delta k$, the matrix E is a 3×7 matrix, if—as described above—the vector $\Delta f$ includes three components.

In an alternate embodiment, the densities of the original in the three basic colors of red, green and blue are used as input variables, which are linked with the exposure matrix E in accordance with the above equation. In that case, the exposure matrix E is a 3×3 matrix.

Thus with the aid of the vector $\Delta k$ and the exposure matrix E as a paper-related film model 20 (20a), the vector $\Delta f$ can be determined, and with it, the quantities of copying light or the copying light vector e can be determined.

Before production begins in a photographic printer, the printer is first calibrated or setup tested. This is understood to mean essentially the optimization of the two models 10 (10a), 20 (20a) shown in FIG. 2. Once this calibration has been performed, then with the aid of the cumulative data of the respective negative frame and the aid of the paper-related film model 20 (20a), the quantity of copying light required for the projection is ascertained. The paper model 10 (10a), or the inverse paper model is used in the event of a second pass, if the correction values determined by the operators have to be converted into exposure corrections. It is also used in calibration to optimize the paper-related film model 20 (20*a*).

Briefly summarized, the first printer can be calibrated as follows: First, the paper model 10 is determined. For many applications, a linear approach suffices for the paper model 10. In such cases, an invertible matrix, the paper matrix, can be used as the paper model 10. This paper matrix is determined on the basis of a series of a plurality of test exposures, for example 15 test exposures. These test exposures are made using a test filter, or in other words without an original, and the color densities of the test filter are essentially equivalent to those of a negative of average film density ($f_0$). The various test exposures are each made at predetermined copying light deviations, characterized by copying light vectors $\Delta e_N$. Thus, the changes in the effective exposure, described by the vectors $\Delta b_N$, for the test exposures are known as well. The changes in the paper densities $\Delta d_N$ of the test copies made are measured using a densitometer and are then known as well. In accordance with the illustration of the paper model in FIG. 2, the following equation applies to the paper matrix:

$$\Delta d_N = P \, \Delta b_N \; (P=\text{paper matrix}).$$

Now that the values of $\Delta b_N$ and $\Delta d_N$ are known, the paper matrix P can be determined by means of a regression process (multilinear regression).

Next, the exposure matrix E, which serves as the paper-related film model 20, is optimized. To that end, the assumption is a first approximation value for the exposure matrix E, which value is either known or can be ascertained as described earlier.

For optimizing the exposure matrix E, a series of test films of different manufacture is used, for instance ten test films. Each of these test films includes a plurality of negative frames, for instance about 10 of them, of which each is homogeneously exposed on its own terms, but each negative frame has a different film density (different coloring and/or lighting) compared to the other. Of the total of n negative frames on the test films, test copies are made in the printer. For each of the negative frames, a vector $\Delta k_n$—as described above—is determined, which with the aid of whatever the current exposure matrix E is, serves to determine the requisite quantities of copying light for the particular negative frame. If the exposure matrix is still not optimal, then the result is test copies with a more or less different color cast. Their paper density is measured with a densitometer, and from that the paper density vectors $\Delta d_n$ are determined. By means of the known inverse paper matrix $P^{-1}$, the vectors $\Delta b_n{}^*$ can be determined, which describe the exposure deviations that the changes in the paper density ($\Delta d_n$) have brought about. On the other hand, from the known vectors $\Delta k_n$ for the negative frames and the also-known vectors $\Delta e_n$ for the particular copying light used, with the aid of the current exposure matrix E, the vectors $\Delta b_n$ can be calculated in accordance with the following equation:

$$\Delta b_n = \Delta e_n - E \, \Delta k_n.$$

By means of a mathematical optimizing process, a better value for the exposure matrix E is now calculated, for instance by minimizing the error:

$$E_F = \frac{1}{n} \sum_n |\Delta b_n * - \Delta b_n|^2$$

Multilinear regression is suitable as the optimizing process.

In this way, the exposure matrix can be optimized iteratively. If the printer is calibrated, or in other words if the exposure matrix E is optimal, then this optimal exposure matrix E can be used to copy all the negative frames of the various test films to a uniform gray with great accuracy regardless of the lighting, coloration, or the film manufacturer. This also serves at the same time as a criterion for ending the optimization of the exposure matrix E. If the projection of the various negative frames of the various test films produces test copies that all have the same uniform gray regardless of the negative frame involved, (i.e. if they are essentially identical), then the exposure matrix E is optimal, and the printer has now been setup tested.

If at the onset of the optimization, no good first approximation value for the exposure matrix E is known, then such a value can be obtained for instance as follows: it is assumed that the spectral sensitivities of the photo paper are concentrated at three discrete wavelengths, namely as examples $\lambda_B \approx 470$ nm, $\lambda_G \approx 550$ nm and $\lambda_R \approx 690$ nm. On this assumption, the three components of the film density vector f correspond precisely to the values for the spectral film density that have been measured at precisely these wavelengths. On the other hand, the spectral film densities can be calculated directly with very good approximation from the Karhunen-Loève transformation vector $\Delta k$ (which has been determined not only from the spectral film density values at precisely the aforementioned three wavelengths, but also from the spectral film density values at the other wavelengths), using the inverse Karhunen-Loève transformation. Thus, via the aforementioned equation:

$$\Delta f = E \, \Delta k,$$

a first approximation value for the exposure matrix E is also known.

An exemplary method of the invention is characterized by having the second printer calibrated to the first printer by means of a setup test process. For the ensuing description it will be assumed that the first printer for making the first copies has already been calibrated as described above. That is, from all the negative frames on the test films, uniformly gray, essentially identical test copies are made with the first printer, using the $\Delta k_n$ vector, determined individually for each negative frame, with seven KLT coefficients and the optimal exposure matrix E. The setup test method for calibrating the second printer to the first printer is then carried out as follows.

From the same test films with the same negative frames with which the first printer was calibrated, test copies are now made with the second printer as well. To that end, first, the vectors $\Delta k_n$ determined in the first printer for each negative frame are delivered as original-specific data to the computing and control unit 4*a* (FIG. 1) of the second printer. It is naturally understood that the vectors $\Delta k_n$ ascertained in the first printer have been stored in memory. With the aid of a current exposure matrix for the second printer and of the vectors $\Delta k_n$ which have been determined in the first printer, the quantities of copying light required for projecting the negative frames on the test films are now ascertained individually, for instance by the computing and control unit 4*a* of the second printer. From these quantities of copying light, control signals for the color filters 7*a* provided in the copying station 5a of the second printer are ascertained (naturally, those skilled in the art will appreciate that other known methods for controlling the exposure in the three colors can be used), the color filters being brought into the copying beam path on the specification of the control signals when the respective negative frame is copied into the photo paper. The test copies made in this way in the second printer are developed in the paper processor P(Pa) and then analyzed. If the test copies made in the second printer are likewise essentially identical (e.g., all have the same uniform gray "color") regardless of which negative frame on the test films is used, then the second printer is calibrated to the first printer, and the setup test process is completed. If the test copies made in the second printer are not uniformly gray, then the test copies are measured by densitometry, and by means of the measured paper densities, for instance in a logically identical way to that described above, a better approximation value for the exposure matrix of the second printer is determined. In this way, the exposure matrix of the second printer is optimized iteratively, until, using the vectors $\Delta k_n$ determined in the first printer, uniformly gray test pictures result in the second printer as well, regardless of which individual negative frame of the test films is involved. If this is achieved, then the second printer has been calibrated to the first.

When the test copies are assessed by densitometry if needed, they are scanned regionally, such as pixel by pixel. The scanning light transmitted from each scanning region of the respective test copy is delivered to a detector array, broken down spectrally, and converted into wavelength- and intensity-dependent electrical scanning signals. The electrical scanning signals are digitized and evaluated to ascertain copy-specific data, such as the paper density vectors $\Delta d_N$. With the aid of the copy-specific data (paper density vectors $\Delta d_N$), the exposure matrix of the second printer is then optimized, for instance analogously to the way described above, and the original-specific specific data (vectors $\Delta k_n$) determined in the first printer remain unchanged.

Once the second printer has been optimally calibrated to the first, the second printer in the normal production mode is capable, with the aid of the vector $\Delta k$ ascertained in the first printer for a certain original, and the with the aid of its own exposure matrix, of making a second copy from this original, the second copy being substantially identical to the first copy made in the first printer. It is no longer necessary to re-determine the vector $\Delta k$ in the second printer. This is advantageous particularly when corrections are made in the second pass. Since in the second pass without corrective provisions second copies are in fact made that are substantially identical to the first copies, corrections can be made much more efficiently and with markedly greater success in terms of the desired improvement.

Figure 3:
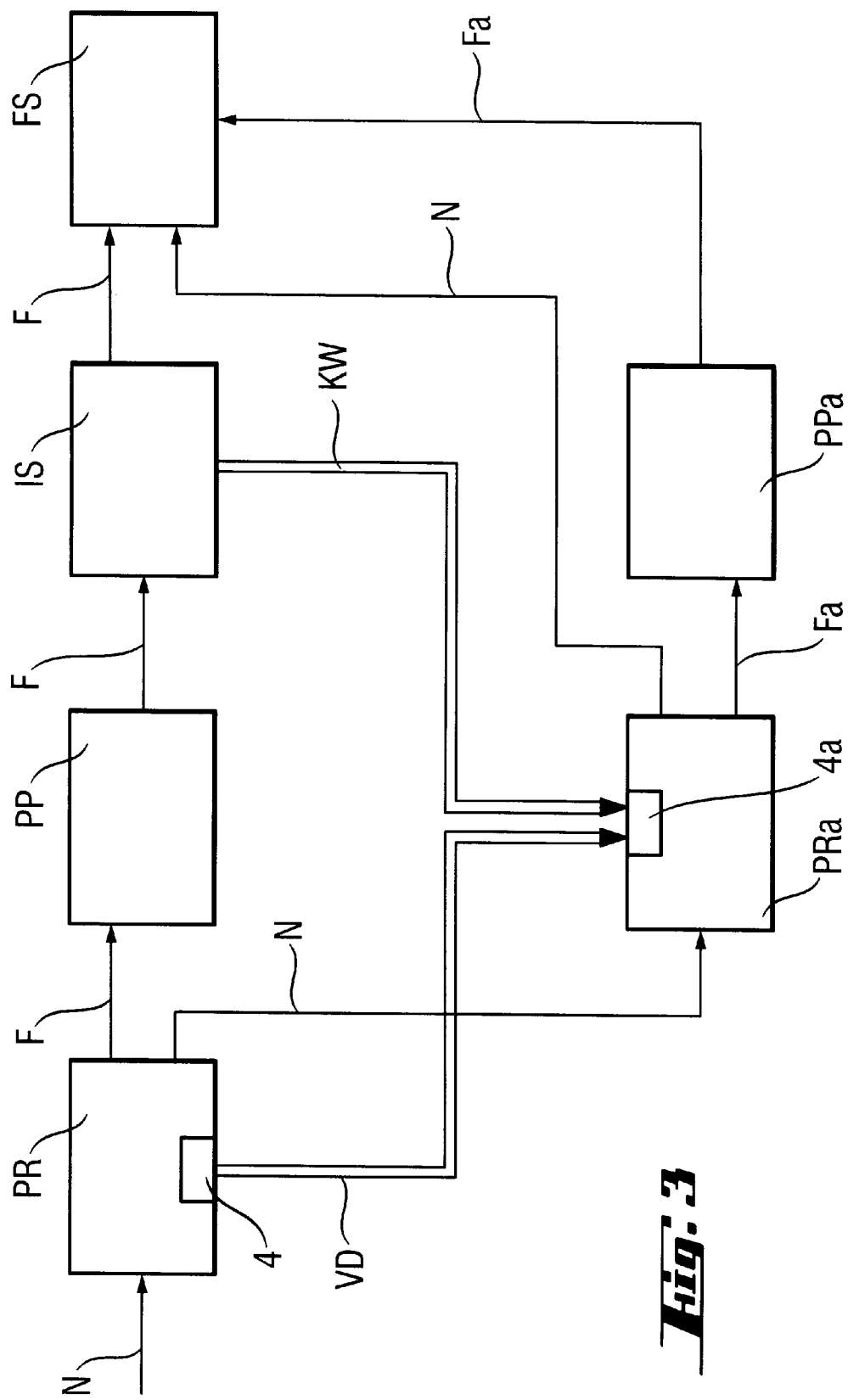
FIG. 3 is a block diagram of parts of a processing system for performing a first exemplary method of the invention.

FIG. 3, in a schematic block diagram, shows the parts of a processing system sufficient for understanding an exemplary method according to the invention for producing photographic copies. The processing system includes the first photographic printer PR with its computing and control unit 4 and the second photographic printer PRa with its computing and control unit 4a. For example, the first printer PR is a high-speed printer, and the second printer PRa is a minilab. One of the two paper processors PP and PPa is downstream of each of the two printers. The paper processors PP, PPa can each form a structural unit with the associated printers PR, PRa, or may each be a separate device. The processing system also includes an inspection station IS, in which the first copies are inspected, and a cutting and packaging station FS. The arrows identified by the letter N indicate how the negative films with the originals to be copied pass through the processing system. Naturally, this illustration should be understood symbolically. Typically, when high-speed printers are used, a large number of negative film strips is first spliced together to make a long, cohesive length of film, which is wound up onto a roll. This roll is docked to the input side of the first printer PR, and the length of film is fed into the printer PR. On the output side of the printer PR, the length of film can for instance be wound up onto a roll again, and this roll can then be carried to the second printer PRa. Procedures of this kind are also included in the symbolic illustration represented by the arrows N. Analogously, the arrows marked F and Fa symbolically indicate how the copy material (photo paper) passes through the processing system. The double arrows marked VD and KW each symbolize a data flow, namely of original-specific data (double arrow VD) and correction values (double arrow KW).

In this exemplary method of the invention, it has been assumed that the first printer PR is calibrated, and the second printer PRa is calibrated to the first printer PR. These calibrations can be performed as described in detail above. Also, by way of example, the case where the negative films to be copied have been spliced together into a length of film which is wound up onto a roll will be referenced.

In the first pass, the first photographic copies are made as described above using the first printer PR. In this process, each frame image (original) is scanned regionally, such as pixel by pixel, with scanning light, and from the scanning light transmitted from the respective frame image, the associated vector $\Delta k$ with the KLT coefficients as original-specific data is determined and stored in memory. From the vector $\Delta k$, with the aid of the paper-related film model (exposure matrix), the copying light quantity required to expose this original are determined, and the respective original is projected with the copying light quantities ascertained onto the photo paper F (copy material). On the output side of the first printer, the spliced negative films are wound up again onto a roll. The exposed photo paper, which typically is also in the form of a long strip, is developed in the downstream paper processor PP. The first copies made in this way are subjected, in the inspection station IS, to a visual inspection by the operators. A decision is made as to whether the picture quality of the first copy is sufficient, or whether a second copy must be made from the associated original. As needed, the operators determine correction values KW for making the second copies. These correction values KW are changes in the paper density. That is, from the first copy, the operators decide which change in the paper density, described by the vector $\Delta d$, is desired so that the second copy will have a better picture quality than the first. The operators can mark the unsatisfactory first copies, for instance, with a grease pencil or by attaching self-adhesive labels. It is also possible for the desired correction values to be written directly on the associated first copy, for instance with a grease pencil. However, it is also possible to mark the unsatisfactory first copies electronically, for instance by a suitable input via a keyboard, and to acquire the desired correction values as electronic data via a keyboard.

Such inspections, or the determination of correction values, are well known and will therefore not be described in detail here. Typically, the operators have partly automated and/or computer-supported machines available, which facilitate the work steps necessary for the inspection and determination of the correction values KW. The correction values, for instance the vectors $\Delta d$, are transferred together with identification data, from which it can be determined which original the various correction values KW (vectors $\Delta d$) refer to, to the computing and control unit 4a of the second printer PRa. This can be done for instance via a data line between the inspection station IS and the second printer PRa, or by means of a keyboard by way of which the data are fed into the computing and control unit 4a of the second printer PRa.

The first copies that already have satisfactory picture quality are transported to the cutting and packaging station FS, where the individual paper pictures on the length of photo paper are cut apart.

The roll docked to the output side of the first printer PR and on which the originals already processed in the first pass are located is separated from the output of the first printer PR, for instance when the roll is full, and docked to the input side of the second printer PRa for the second pass. The original-specific data (i.e. the vectors $\Delta k$) determined in the first pass and stored in memory in the computing and control unit 4 of the first printer PR are transferred together with identification data that relates frame images to their respective vectors $\Delta k$ to the computing and control unit 4a of the second printer PRa. This transfer can be made over a data line.

During the second pass, the originals in the scanning station 1a (FIG. 1) of the second printer are no longer reassessed spectrally, so that scanning station 1a is not needed. However, since it is typically present in printers, it can be utilized to check the identity of the various originals. For calculating the copying light quantities for the second pass, the computing and control unit 4a of the second printer has the following information available: It "knows" which originals need second copies made from them, and it "knows" the respective associated original-specific data in the form of the vectors $\Delta k$ and the associated correction values in the form of the vectors $\Delta d$.

In the computing and control unit 4a of the second printer PRa, for those originals from which second copies are to be made, in each case with the aid of the associated vector $\Delta k$ that originates in the first pass and with the aid of the paper-related film model (exposure matrix) for the second printer PRa, the vector $\Delta b'$ is determined, which does describe the exposure correction but does not yet take into account the desired correction values (vector $\Delta d$). Moreover, the respective associated correction value (vector $\Delta d$) is transformed by means of the inverse paper model (inverse paper matrix) into an exposure correction value, described by the vector $\Delta b''$. By means of these two vectors $\Delta b'$ and $\Delta b''$, the copying light quantities for the second pass can now be ascertained for the associated frame image (original). With these copying light quantities, which consequently take the desired correction into account, the projection of the frame image onto the photo paper takes place in the second pass.

On the output side of the second printer PRa, the spliced negative films are wound up onto a roll again, which is then carried to the cutting and packaging station FS. The exposed photo paper, which for instance is also in the form of a long strip (arrow Fa in FIG. 3) is developed in the downstream paper processor PPa. Next, the developed second copies Fa are carried to the cutting and packaging station FS. In the cutting and packaging station FS, the individual paper prints on the length of photo paper that have been made in the second pass are cut apart; the length of film having the negative films is also cut into short strips—typically four frames—and the first and second copies and the negative film strips are sorted by orders and each is packaged in customer order envelopes.

It is also possible to perform an inspection of the second copies after the second pass. This may be necessary to learn whether the correction values have brought about the desired improvement in the picture quality of the second copy. If Additional printing passes can be made to increase the quality.

Figure 4:
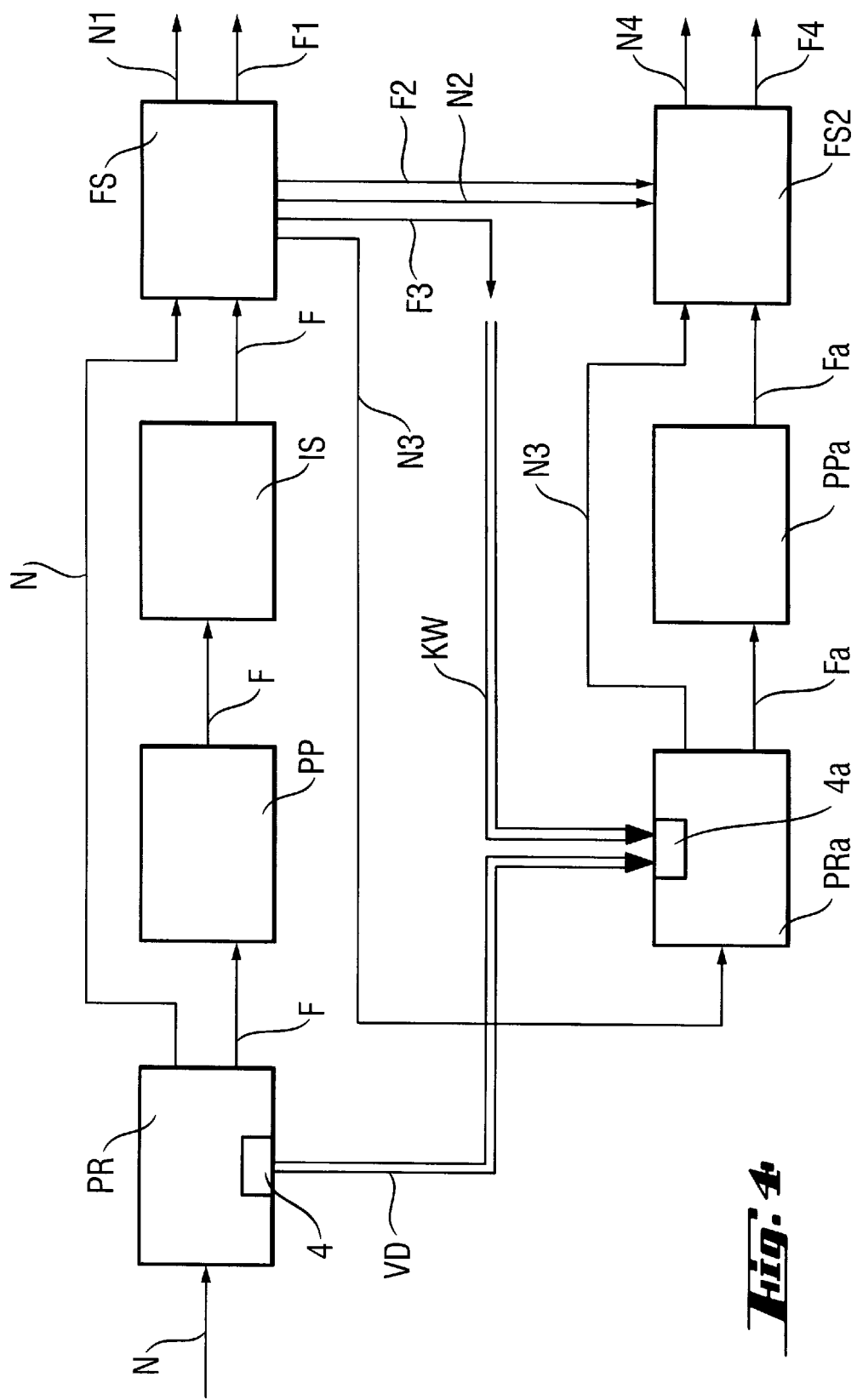
FIG. 4 is a block diagram as in FIG. 3, but for a variant of the first exemplary method.

In conjunction with FIG. 4, a variant exemplary method of the invention will now be described. The processing system shown in terms of a schematic block diagram in FIG. 4 is largely equivalent to that shown in FIG. 3. Elements that are identical or equivalent in function are provided with the same reference symbols in FIGS. 3 and 4 and will therefore not be described again. The following remarks are limited to the differences in this variant. Otherwise, the above explanations of the exemplary method of the invention are equally valid for the variant.

In this variant, the spliced negative films, which after the first copies were made have been wound up onto a roll on the output side of the first printer PR, are first delivered, after the first pass, to the cutting and packaging station FS, where they are cut into short negative strips—typically with four frames each.

The developed first copies, typically in the form of a long length of photo paper, then leave the paper processor PP to enter the inspection station IS, where they are inspected. In this variant, however, the correction values are not determined by the operators until later. In the inspection station, it is first decided only whether a second copy should be made from the associated original, or whether the first copy is of satisfactory quality. The first copies that are not of satisfactory quality are marked. This marking can be done directly on the first copy, for instance with a grease pencil or self-adhesive labels that are applied to the unsatisfactory first copies. However, in addition or instead, it is also possible to provide an electronic "marking", or in other words to acquire data on the first copies that are to be corrected. The first copies are therefore also carried to the cutting and packaging station FS, where the individual paper prints on a length of photo paper are cut apart, and the unsatisfactory first copies are rejected. If one complete customer order, that is, a complete negative film, for instance, requires no second copies, then the associated negative strips are packed together with the associated paper prints in an order envelope, and the processing of this customer order is completed. This situation is represented symbolically in FIG. 4 by the arrows F1 and N1.

Conversely, if in one complete customer order at least one first copy has been made that is found to be of unsatisfactory quality in the inspection station IS and has consequently been marked, then all the negative strips of the negative film along with all the first copies that belong to this customer order are handled as follows: The first copies of this customer order that are of satisfactory quality are carried to a second cutting and packaging station FS2, as symbolically indicated by the arrow F2 in FIG. 4. The negative strips, each having four frames for instance, on which only frames that led to satisfactory first copies in the first pass are located are carried to the second cutting and packaging station FS2, as symbolically indicated by the arrow N2 in FIG. 4. The unsatisfactory first copies are rejected (arrow F3), and for every unsatisfactory first copy, analogously to what has already been described, the operators determine correction values, such as the vectors $\Delta d$ (double arrow KW). These correction values are input, for instance, via a keyboard, into the computing and control unit 4a of the second printer PRa. The four-frame negative strips on which the frames belonging to the unsatisfactory first copies are located are delivered to the second printer PRa (arrow N3).

Optionally, the individual negative strips can be re-spliced before they are fed into the second printer PRa. Now, analogously to the description above, the second pass is performed using the second printer PRa. Once again, for determining the requisite copying light quantities for the respective frame image in the computing and control unit 4a of the second printer PRa, the original-specific data that were ascertained for that frame image in the first pass, that is, the vector $\Delta k$ with the KLT coefficients belonging to the respective frame image, as well as the correction values (vector $\Delta d$) determined by the operators, are used. The second copies Fa are developed in the paper processor PPa and then carried to the second cutting and packaging station FS2. The negative strips are also delivered, after the second pass, to the second cutting and packaging station FS2 (arrow N3), where they are again, if they were re-spliced before the second pass, cut apart into the four-frame negative strips. In the second cutting and packaging station FS2, the first and second copies as well as the associated negative strips are sorted by customer order and packaged in order envelopes. This completes the processing of the customer order, as symbolically indicated by the arrows N4 and F4.

It is understood that in an exemplary method of the invention, the vectors $\Delta k$ with the KLT coefficients need not necessarily be used as the original-specific data. Although the KLT coefficients can be used, other variables that are representative for the density distribution of the individual original can also be used as original-specific data. For example, the densities of the originals in the three colors blue, green and red that can be determined with conventional scanners can also be used as the original-specific data, or can be used to determine original-specific data.

For calibrating the first printer or for calibrating the second printer to the first printer, the above-described special test films need not necessarily be used. It is also possible to carry out these calibrations—that is, especially the determination or optimization of the paper models and the paper-related film models—using production negatives. The term "production negatives" means negatives that occur in normal operation, for instance in processing customer orders. Another procedure for calibrating the two printers using production negatives, for instance, will now be described.

First, the first printer is calibrated; that is, for this purpose the exposure matrix, which is an example for the paper-related film model, and the paper model or the model inverse to it (inverse paper model), is determined or optimized. During the calibration, the first copies (paper prints) produced from the production negatives are assessed by densitometry. This assessment can be made with a densitometer, which is located at the output of the paper processor downstream of the first printer and which assesses the developed paper prints "on-line". To do so, the developed paper prints are scanned regionally, such as pixel by pixel. The scanning light remitted from each scanning region of the respective paper print is delivered to a detector array, broken down spectrally, and converted into wavelength- and intensity-dependent electrical scanning signals. The electrical scanning signals are digitized and evaluated to ascertain copy-specific data, which can be the paper density vectors $\Delta d_n$ (the subscript "n" is intended to indicate that this involves the calibration operation).

Figure 8:
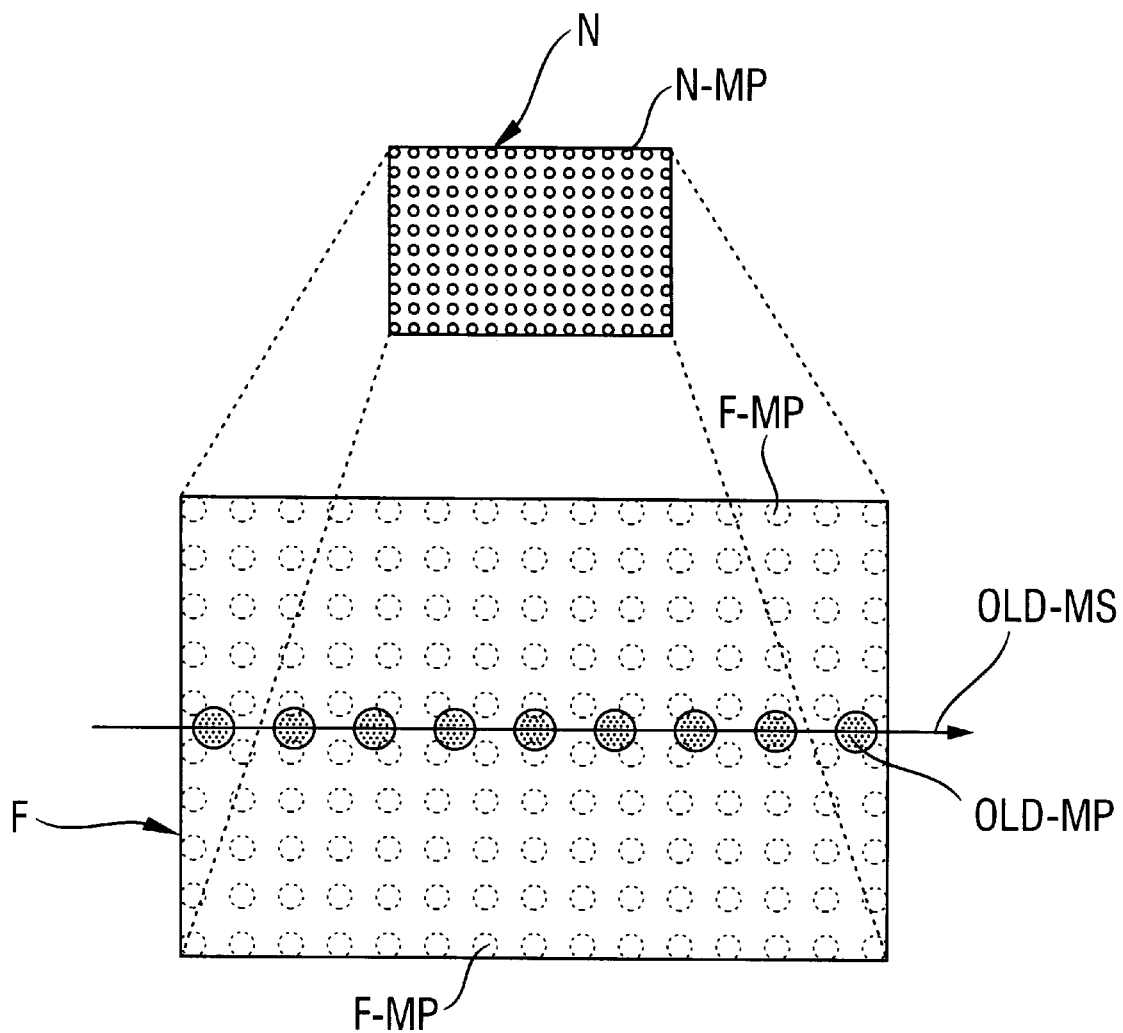
FIG. 8 shows an original and a copy, to illustrate a mode of proceeding in optimizing the models, using production negatives.

When production negatives are used for the calibration, it is possible to proceed as will now be described in conjunction with FIG. 8. To that end, FIG. 8 shows a negative of a negative film N and a first copy made from it on photo paper F. The individual negative measurement points N-MP are indicated on the negative (in reality, the resolution is much finer, but showing this would be problematic in a drawing). On the first copy made on the photo paper F, the projections F-MP of the negative measuring points N-MP are indicated. A measuring track OLD-MS of the densitometer is also shown, located at the output of the paper processor PP downstream of the first printer (FIG. 1) which assesses the developed paper prints "on-line".

The measurement track OLD-MS as shown extends in a straight line longitudinally in the center, but the choice of a different measurement track will be equally possible. FIG. 8 also indicates some measurement points OLD-MP along this measurement track OLD-MS. In a printer, the resolution of the measurement points on the negative and on the paper print, and the enlargement used in the copying, are known. It is also known which point of the negative is being projected on the center of the paper print. An unambiguous association can thus made, and for each measurement point OLD-MP on the paper print, a number of measurement points N-MP, for instance four of them, on the negative that are closest to this measurement point on the paper print can be ascertained. If the measurement point OLD-MP on the left-hand edge of the paper print in FIG. 8 is taken as an example, then the four measurement points N-MP in question on the negative are those that correspond, in order from the left, to the first two projections F-MP on the paper print in the first line each above and below the measurement track OLD-MS. The various measurement data (film density, paper density, copying light and the associated film type) are stored in memory for later evaluation.

Before a series of measurement data is evaluated, a check is made as to whether the series of data originates in more than a minimum number of different film types, for instance more than ten different film types. It is also checked whether the region encompassed by the measurement data in terms of color and density is large enough for both the film densities (for ascertaining the paper-related film model) and the paper densities (for ascertaining the paper model). If there are too many individual film types in the series of data, then from this film type only some of the measurement data are used for the evaluation.

Figure 5:
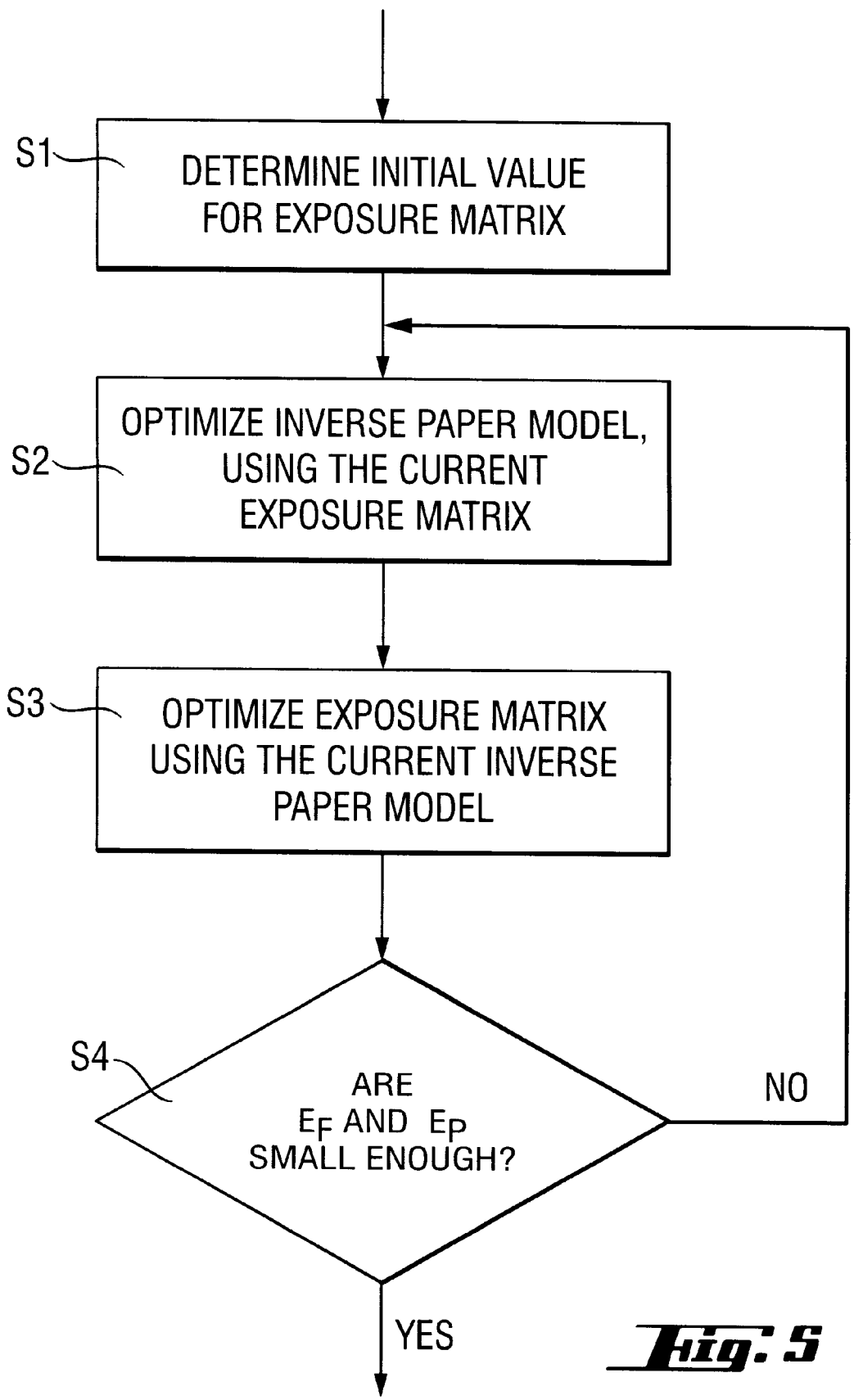
FIG. 5 is a flow chart for illustrating a mode of proceeding in optimizing the paper model and the paper-related film model.

The procedure in calibrating the first printer is illustrated in FIG. 5 in terms of a flowchart. First, in a first step S1, a first approximation value is determined as an initial value for the exposure matrix. This can be done for instance as explained above (it is assumed that the spectral paper sensitivities are concentrated on three discrete wavelengths, etc.), or else an initial value for the exposure matrix is already known. Using the current exposure matrix, copies are now made from the production negatives used for the calibration. These copies are developed and analyzed by means of the densitometer located at the output of the paper processor downstream of the first printer.

Thus, for the production negatives that are used for the calibration, the following variables are known: the original-specific data, in the form of the vectors $\Delta k_n$ (from the assessment of the negatives); the film density vectors $\Delta f_n$ resulting from the current exposure matrix; the paper density vectors $\Delta d_n$; and the copying light vectors $\Delta e_n$ that have led to the paper density vectors. In a second step S2 (FIG. 5), the inverse paper model is now optimized, using the current exposure matrix, which itself is unchanged in this step S2. To that end, from the known vectors $\Delta k_n$ for the negative frame images and the also-known vectors $\Delta e_n$ for the copying light used in this case, with the aid of the current exposure matrix E, the vectors $\Delta b_n$ are calculated in accordance with the equation already mentioned:

$$\Delta b_n = \Delta e_n - E \Delta k_n.$$

On the other hand, the vectors $\Delta b_n$ are linked to the measured paper density vectors $\Delta d_n$ via the equation:

$$\Delta b_n = P^{-1} \Delta d_n,$$

where P designates the operator used as a paper model, or in the case of a linear paper model, the paper matrix, for instance, and $P^{-1}$ is the operator inverse to P, which is used as the inverse paper model. By means of a mathematical optimizing method, such as a compensation calculation, the parameters of the inverse paper model for which the error $$E_P = \frac{1}{n} \sum_n |P^{-1} \Delta d_n - \Delta b_n|^2 = \frac{1}{n} \sum_n |P^{-1} \Delta d_n - \Delta e_n + E \Delta k_n|^2$$

is minimal are now determined. The exposure matrix E remains unchanged. Once the inverse paper model has been optimized, the exposure matrix is optimized in a step S3, as already described in detail above. That is, the error $$E_F = \frac{1}{n} \sum_n |\Delta b_n * - \Delta b_n|^2$$

is minimized. The current inverse paper model (that is, the one previously optimized in step S2) is used and remains unchanged in the optimization of the exposure matrix. Next, in a step S4, it is checked whether the errors $E_F$ and $E_P$ are small enough, or in other words if they undershoot a predetermined threshold value (that is, whether the predeterminable demands for the accuracy of the models are fulfilled). If not, then the exposure matrix optimized previously in step S3 is used, and the inverse paper model is re-optimized, and so forth. This loop is repeated until the models meet the demands for accuracy, or in other words until the errors $E_F$ and $E_P$ are small enough, or until further iteration brings no further improvement.

The two models, that is, the paper-related film model (exposure matrix) and the paper model or inverse paper model, are accordingly optimized in alternation, in each case keeping the respectively other model constant, until such time as the errors $E_F$ and $E_P$ are small enough, or until further iteration brings no further improvement. Once this is achieved, the calibration of the first printer is complete.

For calibrating the second printer to the first printer, the procedure is logically the same using the same production negatives as in the calibration of the first printer, but this time in the second printer, the vectors AL that were determined in the setup-tested first printer are used as the original-specific data. That is, these vectors $\Delta k_n$ are not re-determined in the second printer. As a criterion showing that the second printer is calibrated to the first, or in other words that the paper model and the paper-related film model are optimal for the second printer, the condition can be used that the paper density vectors $\Delta d_n$ of the developed second copies, vectors that have been determining using a densitometer located for instance at the output of the paper processor downstream of the second printer, are essentially identical to the paper density vectors of the corresponding first copies that were made on the calibrated first printer.

For many applications, a linear approach suffices for the paper model in both printers. In such cases, the paper model can be replicated by a suitable paper matrix. The range of validity of such a linear model is limited, however, to a certain area surrounding the operating point on the characteristic curve for the respective pigment. A more accurate model, conversely, takes the nonlinearity of the characteristic curves into account as well. Such a nonlinear paper model, of the kind shown in FIG. 6, can also be used for an exemplary method of the invention, in both the first and the second printer.

Figure 6:
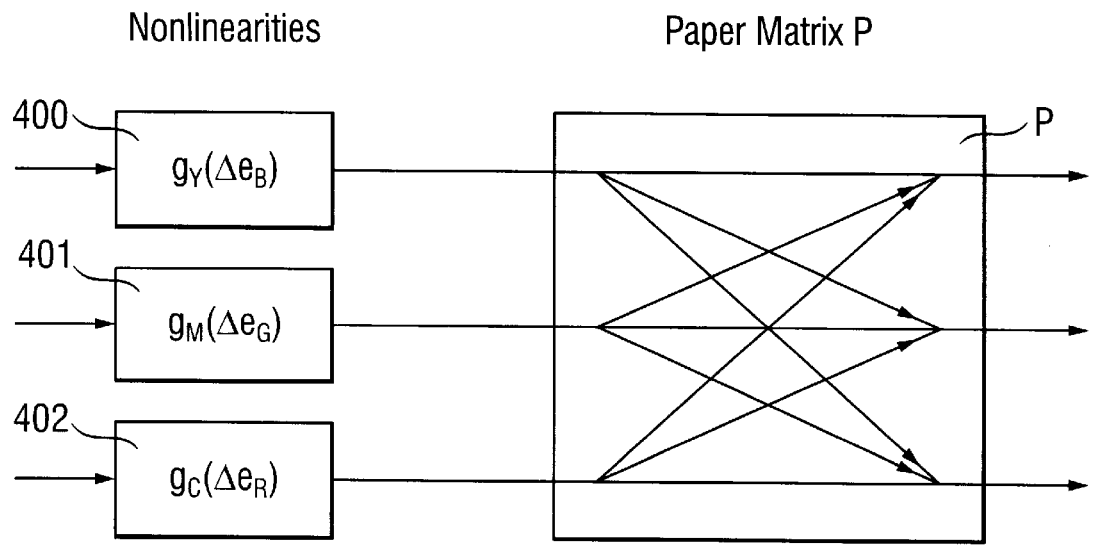
FIG. 6 shows a paper model.
Figure 7:
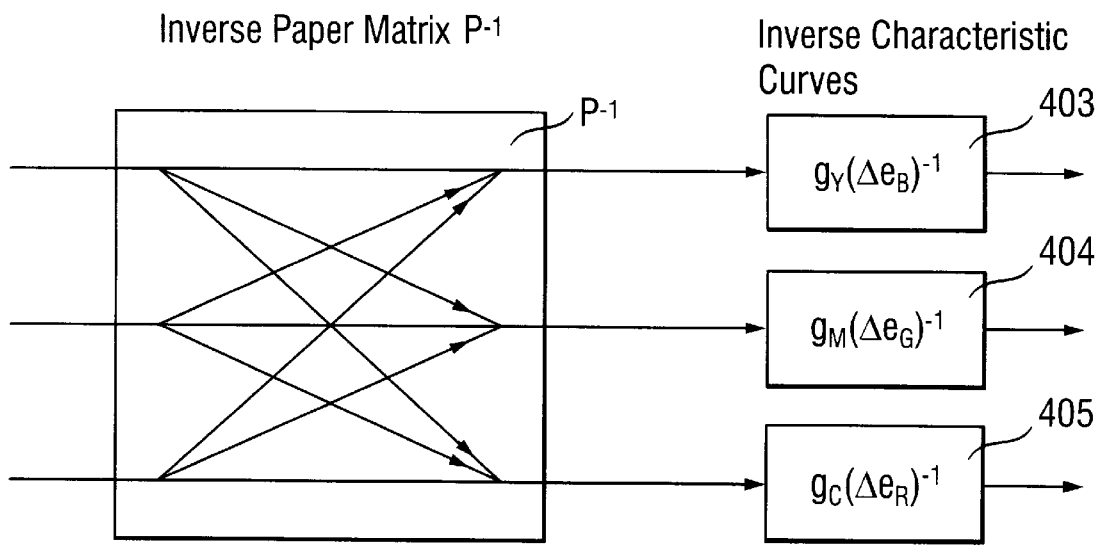
FIG. 7 shows an inverse paper model.

According to FIG. 6, the photo paper is modeled in such a way that first three channels 400, 401, 402 are provided, which essentially replicate the nonlinear change in concentration of the pigments yellow (Y), magenta (M) and cyan (C) as a function of the respective change in lighting in the colors blue ($\Delta e_B$), green ($\Delta e_G$) and red ($\Delta e_R$), especially in the form of dependencies $g_Y(\Delta e_B)$, $g_M(\Delta e_G)$ and $g_C(\Delta e_R)$. A linear model, a paper matrix P, is provided, which takes the secondary absorptions and the overlaps in the spectral paper sensitivities into account. However, as described above, it is not the paper model but rather the inverse paper model, as shown in FIG. 7 and identified overall by reference symbol INP, that is optimized. The nonlinear inverse characteristic curves, which are represented in the channels 403, 404, 405 by $g_Y(\Delta e_B)^{-1}$, $g_M(\Delta e_G)^{-1}$ and $g_C(\Delta e_R)^{-1}$, can for instance be shown in the form of power series. The coefficients of these power series, together with the coefficients of the inverse paper matrix $P^{-1}$, then represent the parameters to be optimized for the model. However, unlike the paper-related film model (the exposure matrix), this overall involves a nonlinear model. The optimization of this inverse paper model INP can now proceed analogously, as described above, for both the first and the second printers.

A number n of homogeneous but differently exposed negative frame images, located on the aforementioned test films, or n production negatives, for which the vectors $\Delta k_n$ with the KLT coefficients are determined (in the second printer, the $\Delta k_n$ determined in the first printer are used again), are copied with predetermined copying light deviations $\Delta e_n$, and the resultant density deviations $\Delta d_n$ of the associated paper prints (copies) are measured with the aid of the densitometer at the output of the paper processor. In principle, if test films are used, a single test negative can be used, and can be acted upon with different copying light deviations $\Delta e_n$. Instead of a negative, a test film whose spectral density is approximately equivalent to a normal negative can be used again. The copying light deviations $\Delta e_n$ are selected such that the resultant paper density deviations $\Delta d_n$ cover the entire range within which the model is intended to be valid. The exposure matrix E remains unchanged in the optimization of the inverse paper model INP. Once the vectors $\Delta k_n$, the exposure matrix E and the copying light deviations ten used are known, the exposure deviations $\Delta b_n$ that have caused the measured paper density deviations $\Delta d_n$ can be determined. By means of a mathematical optimizing process, the parameters of the inverse paper model INP for which the error $$E_P = \frac{1}{n} \sum_n |\Delta b_n * - \Delta b_n|^2 = \frac{1}{n} \sum_n |-\Delta e_n + E \Delta k_n|^2$$

becomes minimal are now determined. Here, the vectors $\Delta b_n *$ again stand for the exposure deviations that result from the use of the inverse paper model INP for the known paper density vectors $\Delta d_n$. Since the inverse paper model INP is a nonlinear model, an iterative method must be used for the nonlinear optimization (see R. Fletcher: "Practical Methods of Optimization", Vol. 1+2, John Wiley & Sons).

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. A method for producing photographic copies from photographic originals in which first copies are produced from the originals in a first pass on a first photographic printer and second copies are produced in a second pass on a second photographic printer, comprising the steps of:

a) scanning the original regionally in a scanning station of the first printer;
   b) delivering scanning light transmitted from each scanned region of the original to a detector array for spectral analysis and conversion into wavelength- and intensity-dependent electrical scanning signals;
   c) digitizing and evaluating the electrical scanning signals to ascertain original-specific data that is specific to the original;
   d) ascertaining first quantities of copying light for projection in a computing and control unit of the first printer with the aid of the ascertained original-specific data and an original model adapted to copy material wherein said model represents behavior of the copy material due to changes in spectral composition of the original;
   e) ascertaining control signals for color filters and shutters provided in a copying station of the first printer from the first quantities of copying light;
   f) placing the filters and shutters in a copying beam path according to the control signals;
   g) developing first copies in a developing station;
   h) calibrating the second printer to the first printer by a setup test method comprising the steps of:
      i) delivering the original-specific data to a computing and control unit of the second printer;
      ii) ascertaining second quantities of copying light for projection in a computing and control unit of the second printer with the aid of the original-specific data and an original model of the second printer, wherein said original model of the second printer represents said behavior of the copy material due to changes in spectral composition of the original;
      iii) ascertaining control signals for color filters and shutters provided in a copying station of the second printer from the second quantities of copying light;
      iv) placing the filters and shutters in a copying beam path of the second printer according to the control signals;
      v) developing second copies in a developing station of the second printer;
      vi) analyzing said second copies; and
      vii) optimizing the original model for the second printer based on the analysis until the second copies are identical to the first copies.

2. The method according to claim 1 further comprising the steps of:

scanning the developed second copies regionally, pixel by pixel;
   delivering the scanning light transmitted from each scanned region of the second copies to a detector array for spectral analysis and conversion into wavelength- and intensity-dependent electrical scanning signals;
   digitizing and evaluating the electrical scanning signals for emitting copy-specific data; and
   optimizing the original model of the second printer with the aid of the copy-specific data for the second printer, while the original-specific data determined for the first printer remains unchanged.

3. The method according to claim 1 further comprising the steps of:

subjecting the developed first copies to an inspection, in which it is decided whether a second copy will be made from the associated original and in which the optional correction values are determined for making the second copy;
   delivering the original from which the second copies are made and the associated correction values to the second printer; and
   transforming the correction values in the computing and control unit of the second printer into exposure correction values, which together with the original-specific data from the first printer are used to determine the quantities of copying light for making the second copy.

4. The method according to claim 1 further comprising the steps of:

digitizing the scanning signals resulting from the spectral scanning of the original in the first printer, and subjecting the scanning signals to an orthogonal transformation; and
   using the transformation coefficients originating in this transformation as the original-specific data, which are used both as input variables for the original model in the first printer for the first copy and as input variables for the original model in the second printer.

5. The method according to claim 4 wherein the transformation is the Karhunen-Loève transformation.

6. The method according to claim 1 wherein production negatives are used in the setup test method for calibrating the second printer to the first printer.

7. The method according to claim 1 wherein said step of scanning the original regionally in a scanning station of the first printer is performed pixel by pixel.

8. The method of claim 1 wherein the second quantities of copying light for projection in a computing and control unit of the second printer match the first quantities of copying light for projection in a computing and control unit of the first printer.

* * * * *